(12) United States Patent
Cresswell et al.

(10) Patent No.: US 7,455,020 B1
(45) Date of Patent: Nov. 25, 2008

(54) METHOD AND APPARATUS FOR SEEDING CANOLA AND FLAX

(75) Inventors: Mark Cresswell, St. Brieux (CA); Gerard Bourgault, St. Brieux (CA)

(73) Assignee: Bourgault Industries Ltd, St. Brieux, Saskatchewan (CA)

( * ) Notice: Subject to any disclaimer, the term of this patent is extended or adjusted under 35 U.S.C. 154(b) by 0 days.

(21) Appl. No.: 12/126,343

(22) Filed: May 23, 2008

(51) Int. Cl.
*A01C 7/00* (2006.01)
*A01C 9/00* (2006.01)

(52) U.S. Cl. ...................................... 111/188; 111/900

(58) Field of Classification Search ......... 111/118–129, 111/7.1–7.4, 186–188, 900
See application file for complete search history.

(56) References Cited

U.S. PATENT DOCUMENTS

| 5,396,851 | A | 3/1995 | Beaujot |
| 6,216,616 | B1 | 4/2001 | Bourgault |
| 6,952,998 | B1 | 10/2005 | Summach et al. |

*Primary Examiner*—Christopher J. Novosad
(74) *Attorney, Agent, or Firm*—Frost Brown Todd LLC

(57) ABSTRACT

A method for seeding flax seeds and canola seeds includes: with a plurality of side banding furrow openers, depositing seeds into a corresponding plurality of seed furrows; with each side banding furrow opener, depositing phosphate fertilizer in a corresponding side band in proximity to the seeds in the seed furrows; with a plurality of mid-row banding furrow openers, depositing nitrogen fertilizer, and optionally sulfur fertilizer, in fertilizer furrows where each fertilizer furrow is located substantially midway between adjacent seed furrows. An apparatus for practicing the method is provided as well.

18 Claims, 1 Drawing Sheet

METHOD AND APPARATUS FOR SEEDING CANOLA AND FLAX

This invention is in the field of agriculture and in particular a method and apparatus for seeding and fertilizing, particularly canola and flax.

BACKGROUND

It is well known in agriculture that the location in the soil of seed relative to fertilizer is an important factor in maintaining healthy plants. With many crops it is often beneficial to have a relatively small amount of most types of fertilizer very near the seed, however excessive amounts of fertilizer are known to damage seedlings. Safe fertilizer application rates depend on the proximity of the seed to the fertilizer. If the seed and fertilizer are spread over a wide band, the safe rate is much higher than if the seed and fertilizer are placed together and concentrated in a narrow band.

The simplest seeding implements deposit seed from one tank and fertilizer from another into a single delivery tube that carries the mixture of seed and fertilizer from the tanks to the furrow openers and deposits it in a single furrow made by a furrow opener. Where the mixture is spread over a wide band using a wide furrow opener, quite high rates of some fertilizers may be safely applied however, in the minimum tillage agriculture common today, it is generally desirable to disturb the soil as little as possible, and so narrow openers on wider row spacings are popular. The wider row spacing requires that, in order to achieve a desired application rate of pounds of fertilizer and seed per acre, more product must be placed in each row. These narrow openers spaced farther apart concentrate the seed and fertilizer in a narrow band, greatly limiting the amount of fertilizer that can be mixed with the seed.

The amount of fertilizer that can safely be deposited with the seed varies dramatically depending on the type of fertilizer. Some fertilizers, notably nitrogen in its various forms, cause significant seedling damage at application rates much lower than those typically desired to maximize yield. For this reason nitrogen has historically been deposited in or on the soil in a separate operation prior to seeding, or sometimes after seeding. Granular nitrogen fertilizer is available in an ammonium nitrate form and a urea form, and for many crops the safe application rate of the ammonium nitrate form is somewhat higher than for the urea form. Liquid nitrogen often contains both ammonium nitrate and urea. Nitrogen moves readily through the soil and so can be placed a considerable distance from the seed and still be effective.

Sulfur fertilizer is commonly provided in the form of ammonium-sulphate, and contains a significant proportion of nitrogen in addition to the desired sulfur. Ammonium-sulphate can also damage seedlings when applied at commonly desired rates. Safe rates of application are generally determined by adding the nitrogen content of the ammonium-sulphate to the amount of nitrogen being applied. Similar to nitrogen, sulfur also moves readily through the soil and so can be placed a considerable distance from the seed.

Fertilizers to provide phosphate are also commonly applied, typically at substantially lower rates than nitrogen. These are generally less damaging to seedlings than nitrogen and safe application rates of these fertilizers for most crops is thus higher. Phosphorus fertilizers are also typically applied at lower rates than nitrogen. Phosphate does not move readily in the soil and thus, for satisfactory results, should not be placed too far away from the seed.

Potassium fertilizers are also commonly used typically in the form of potassium chloride. While potassium fertilizer moves more readily through the soil than phosphorus, it is generally accepted that proximity of the chloride to the seedlings is beneficial, perhaps because of an anti-bacterial effect, and so it is desirable to place a portion of the potassium fertilizer with or at least near the seed.

Cereal crops are much less susceptible to seedling damage from fertilizer than are canola and flax crops. Canola and flax are very susceptible to damage from nitrogen especially. Canola generally requires sulfur fertilizer as well, which also contains a significant proportion of nitrogen and so can also cause damage.

Thus the consideration of the optimum placement of fertilizer relative to seed requires consideration of a fairly complex set of factors. In addition, safe application rates also vary significantly with soil type, soil temperature, and soil moisture. Fertilizers may be blended together for placement, and are available in both liquid and granular forms.

Air seeders have become a common implement for seeding and have been adapted to both seed and provide fertilizer in a single pass. Air seeders typically comprise a cart carrying two, three, or more holding tanks for holding particulate agricultural products such as seed and fertilizer. Liquid fertilizer is also often carried in a tank on the same cart or on a separate cart. The agricultural products are delivered through delivery tubes to one or more sets of furrow openers in separate or combined streams. Other types of seeders could also be used to provide the furrows and deposit the appropriate agricultural products in the furrows.

Seeders have taken two distinct routes in their methods of providing both seed and fertilizer in a single pass. In the first, double shoot and triple shoot side banding machines deliver two or three separate streams of agricultural products to a furrow opener assembly. Typically one of the streams will contain all the seed and possibly a small amount of fertilizer, typically phosphate, and the other streams will contain the balance of the fertilizer which may be either a single fertilizer or a blend of the desired fertilizer. The furrow opener assembly is configured to place the streams into closely adjacent bands in the soil, generally about one to two inches apart. In some machines the seed stream will be divided into two separate bands with a band of fertilizer between and below the bands of seed. The bands are separated vertically and horizontally sufficiently to assist in reducing fertilizer damage to the seedlings, but close enough to allow the fertilizer, and particularly phosphate fertilizers, to be readily available to the seedling plants.

Typical arrangements for these side banding seeders include furrow opener assemblies with a single furrow opening member that has a separate port for receiving each stream and is configured to deliver each stream to a separate location so that the streams are placed in the soil in separate but closely adjacent rows or bands. An example of this arrangement is disclosed in U.S. Pat. No. 6,952,998 to Summach et al. Other furrow opener assemblies have two separate furrow opening members mounted on separate legs extending down from an arm. One of the streams is directed to each furrow opening member, and the streams are again placed in separate but closely adjacent bands. An example of this arrangement is disclosed in U.S. Pat. No. 5,396,851 to Beaujot.

Mid-row banding seeders provide the second route for dispensing seed and fertilizer in substantially separated locations. These seeders comprise two sets of furrow opener assemblies attached to the frame, one set to deposit a stream of fertilizer and the other to deposit a stream containing the seed and generally some phosphate fertilizer. The phosphate fertilizer, which does not move readily through the soil, is thus positioned near the seed, while the more readily moving nitrogen and sulfur are located farther away to avoid damage to seedlings.

An example of this type of mid-row banding seeder is disclosed in U.S. Pat. No. 6,216,616 to Bourgault. The Bourgault system uses one set of furrow opener assemblies to deposit the seed stream in laterally spaced seed furrows. The second set of furrow opener assemblies deposits the fertilizer stream in separate fertilizer furrows. Each fertilizer furrow is located about mid way between adjacent seed furrows, such that seed in each seed furrow draws nutrients from the fertilizer between them. While an equal number of fertilizer assemblies and seed assemblies can be provided it has been found to be effective to reduce equipment costs by providing only half as many fertilizer furrows as seed furrows, with the furrows arranged such that there are two seed furrows (SF) between successive fertilizer furrows (FF). Thus moving across the path of the air seeder the arrangement of furrows would be SF-FF-SF-SF-FF-SF-SF-FF-SF. Thus seed in each seed furrow draws the mid row banded nutrients from one direction only. The spacing between seed furrows in such machines is typically 10 to 12 inches, so the seed and fertilizer separation distance is about 5 to 6 inches.

SUMMARY OF THE INVENTION

It is an object of the present invention to provide a method and apparatus for seeding and fertilizing canola and flax that overcomes problems in the prior art.

A significant problem with the side banding seeders is that it can be difficult to maintain separation of seed and fertilizer, especially in certain soil and moisture conditions, for example drier clay soils that tend to lump. Also as the furrow openers wear, the precision of product placement, and thus the separation of seed and fertilizer, is adversely affected as well. Even with the best achievable separation using side banding seeders, substantial damage to the seeds can occur, especially in dry soil conditions or with more volatile fertilizers.

While the wider separation provided by mid-row banding machines avoids the problem of seed damage caused by proximity to fertilizer, the amount of phosphate that can be deposited in the seed furrow to be readily available is limited. For cereal grains the desired application rate for phosphate will typically be within the allowable limit, so that all the desired phosphate can be mixed with the seed and delivered into the seed furrow. The safe application rate of phosphate with canola or flax seeds, however, will often be less than the desired application rate, such that some phosphate must be placed in the mid-row band remote from the seed and thus reducing efficiency. Since seed damage from proximity to phosphate varies with soil type, soil temperature, soil moisture, and the like, applying the maximum rate for average conditions can result in seedling damage and lost yield when conditions change from one field area to another, and with weather or like changing conditions.

Thus, although flax and canola make up a significant proportion of the total crops seeded in many agricultural areas, prior art seeders have limited the amount of phosphate fertilizer that can effectively be applied when seeding these crops.

In a first embodiment the present invention therefore provides a method for seeding flax seeds and canola seeds. The method comprises: with a plurality of side banding furrow openers, depositing seeds into a corresponding plurality of seed furrows; with each side banding furrow opener, depositing phosphate fertilizer in a corresponding side band in proximity to the seeds in the seed furrows; with a plurality of mid-row banding furrow openers, depositing nitrogen fertilizer in fertilizer furrows where each fertilizer furrow is located substantially midway between adjacent seed furrows.

In a second embodiment the present invention provides a seeding apparatus comprising a plurality of side banding furrow openers laterally spaced along a seeder frame. A plurality of mid-row banding furrow openers is laterally spaced along the seeder frame such that a fertilizer furrow made by each mid-row banding furrow opener is located substantially midway between two seed furrows made by the side banding furrow openers. A delivery system is operative to deposit seeds through the side banding furrow openers into a corresponding plurality of seed furrows, and operative to deposit phosphate fertilizer through the side banding furrow openers into side bands in proximity to the corresponding seed furrows, and operative to deposit nitrogen fertilizer through the mid-row banding furrow openers into the fertilizer furrows, Much higher rates of phosphate fertilizer can safely be placed in the side band which is slightly removed from the seed in the seed furrow, than can be placed in the seed furrow. The phosphate nutrient is readily available in close proximity, but far enough away to avoid damage to seedlings. If desired, a portion of the required amount of phosphate fertilizer may be deposited with seed as well.

Advantageously the fertilizer furrow openers can be located midway between pairs of seed furrow openers such that two seed furrows lie between successive fertilizer furrows. Also it is contemplated that efficient use of fertilizer may be enhanced by configuring the side banding furrow openers to place each side band between the corresponding seed furrow and a fertilizer furrow by providing right and left directing side banding furrow openers.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
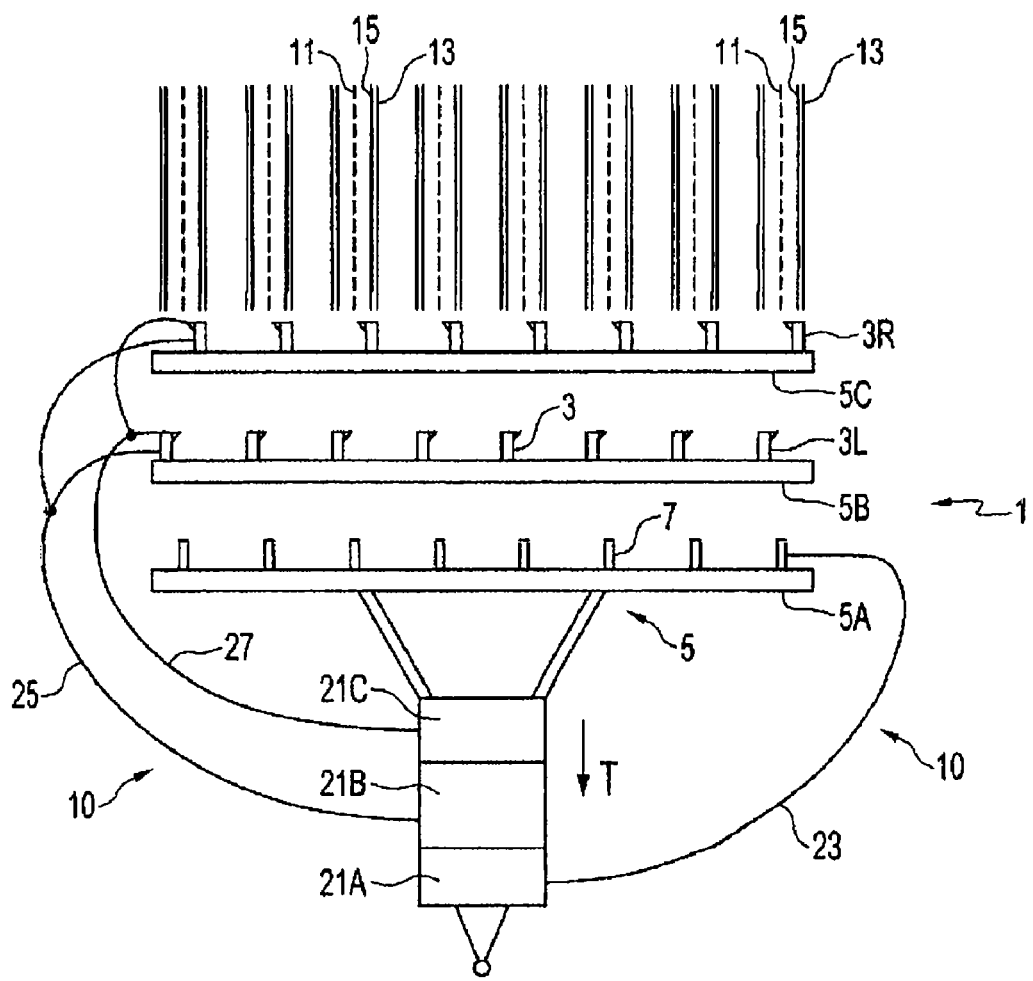
FIG. 1 is a schematic top view of an embodiment of a seeding apparatus of the invention for seeding flax seeds and canola seeds.

FIG. 1 schematically illustrates a top view of an embodiment of a seeding apparatus 1 of the invention particularly adapted for seeding flax seeds and canola seeds and moving in an operating travel direction T. The apparatus 1 comprises a plurality of side banding furrow openers 3 laterally spaced along the seeder frame 5. A plurality of mid-row banding furrow openers 7 are laterally spaced along the seeder frame 5 such that a fertilizer furrow 11 made by each mid-row banding furrow opener 7 is located substantially midway between two seed furrows 13 made by the side banding furrow openers 3.

Figure 2:
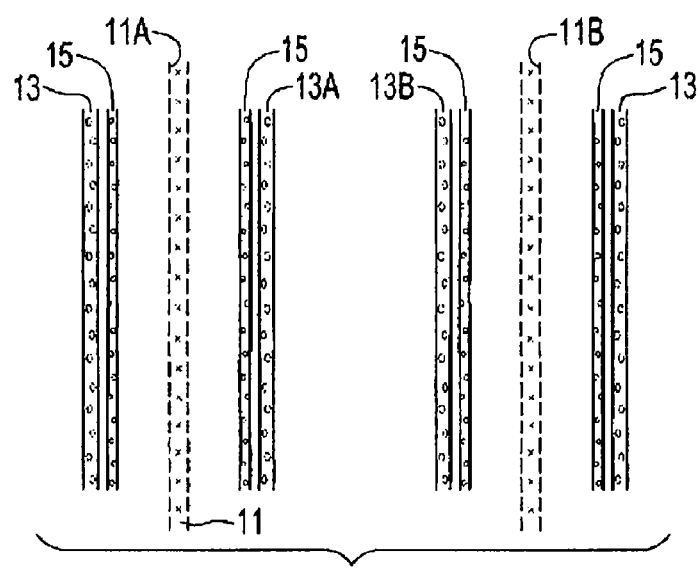
FIG. 2 is a schematic top view of the distribution of agricultural products into furrows and side bands made by the apparatus of FIG. 1.

A delivery system 10 is operative to deposit seeds through the side banding furrow openers 3 into a corresponding plurality of seed furrows 13, as further illustrated in FIG. 2. Typically the apparatus 1 will include packing elements operative to pack the seed furrows however for clarity of illustration these packing elements are not illustrated. The delivery system 10 is also operative to deposit phosphate fertilizer through the side banding furrow openers 3 into side bands 15 in proximity to the corresponding seed furrows 13, and is operative to deposit nitrogen fertilizer through the mid-row banding furrow openers 7 into the fertilizer furrows 11.

In the illustrated apparatus 1, the fertilizer furrow openers 7 are located substantially midway between pairs of seed furrow openers 3 such that two seed furrows 13A, 13B lie between successive fertilizer furrows 11A, 11B. Also it is contemplated that efficient use of fertilizer may be enhanced by, as shown in the illustrated apparatus 1, configuring the side banding furrow openers 3 to place the side band 15 between the corresponding seed furrow 13 and a fertilizer furrow 11 by providing right and left directing side banding furrow openers 3R and 3L.

In the illustrated apparatus 1 the furrow openers 3, 7 are spaced laterally and fore and aft on the frame 5, as is usual in seeding implements to allow crop residue to pass between the shanks on which the furrow openers are mounted. Although other configurations would work as well, in the illustrated apparatus 1 the mid-row banding furrow openers 7 are mounted on the front frame member 5A, left directing side banding furrow openers 3L are mounted on the middle frame member 5B, and right directing side banding furrow openers 3R are mounted on the rear frame member 5C.

The result of the illustrated configuration of the apparatus 1 is that each side band 15 is located between the corresponding seed furrow 13 and a fertilizer furrow 11, as illustrated most clearly in FIG. 2. With the illustrated configuration the flax or canola seedlings in each seed furrow 13 will draw fertilizer nutrients from both the corresponding side band 15 and the corresponding fertilizer furrow 11 on the same side.

The illustrated seeder apparatus 1 comprises a first product tank 21A carrying a nitrogen fertilizer. The delivery system 10 is operative to deliver the nitrogen fertilizer to the mid-row banding furrow openers 7 through conduit network 23. A second product tank 21B carries phosphate fertilizer, and the delivery system 10 is operative to deliver the phosphate fertilizer to both the right and left side banding furrow openers 3R, 3L through conduit network 25, and a third product tank 21C carries flax or canola seeds, and the delivery system 10 is operative to deliver the seeds to both the right and left side banding furrow openers 3R, 3L through conduit network 27.

The delivery system schematically illustrated is of the type that would he used where the delivery system uses an air stream to deliver the agricultural products, or where one or more of the fertilizer products is in a liquid form and is pumped through the conduit network from the tank where it is carried. It is contemplated however that other delivery systems could be used as well.

It is also contemplated that the first product tank could carry a blend of nitrogen and sulfur fertilizers for depositing sulfur as well as nitrogen in the fertilizer furrows. Further, one or both of the first and second product tanks 21A, 21B could carry a fertilizer blend that includes potassium fertilizer where it is desired to provide a potassium nutrient to the crop.

The figures thus illustrate an apparatus suitable for practicing a method of the present invention for seeding flax seeds and canola seeds where the method comprises: with a plurality of side banding furrow openers 3, depositing seeds into a corresponding plurality of seed furrows 13; with each side banding furrow opener 3, depositing phosphate fertilizer in a corresponding side band 15 in proximity to the seed furrows 13; with a plurality of mid-row banding furrow openers 7, depositing nitrogen fertilizer in fertilizer furrows 11 where each fertilizer furrow 11 is located substantially midway between adjacent seed furrows 13.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A method for seeding flax seeds and canola seeds, the method comprising:
   with a plurality of side banding furrow openers, depositing seeds into a corresponding plurality of seed furrows;
   with each side banding furrow opener, depositing phosphate fertilizer in a corresponding side band in proximity to the seeds in the seed furrows;
   with a plurality of mid-row banding furrow openers, depositing nitrogen fertilizer in fertilizer furrows where each fertilizer furrow is located substantially midway between adjacent seed furrows.

2. The method of claim 1 wherein each fertilizer furrow is located substantially midway between pairs of seed furrows such that two seed furrows lie between successive fertilizer furrows.

3. The method of claim 2 wherein each side band is located between the corresponding seed furrow and a fertilizer furrow.

4. The method of claim 1 wherein the rate of phosphate fertilizer to be applied is a desired rate and the desired rate of phosphate fertilizer is all deposited in the seed furrow and the side band.

5. The method of claim 1 wherein the rate of phosphate fertilizer to be applied is a desired rate and the desired rate of phosphate fertilizer is all deposited in the side band.

6. The method of claim 1 further comprising depositing potassium fertilizer in one of the side band and the fertilizer furrow.

7. The method of claim 6 wherein the rate of potassium fertilizer to be applied is a desired rate and the desired rate of potassium fertilizer is all deposited in the fertilizer furrow.

8. The method of claim 1 wherein the furrow openers are mounted on a seeder apparatus, and wherein the seeder apparatus comprises:
   a first product tank carrying a blend of nitrogen and sulfur fertilizer, and a delivery system operative to deliver the blend of nitrogen and sulfur fertilizer to the mid-row banding furrow openers;
   a second product tank carrying phosphate fertilizer, and a delivery system operative to deliver the phosphate fertilizer to the side banding furrow openers; and
   a third product tank carrying seeds, and a delivery system operative to deliver the seeds to the side banding furrow openers.

9. The apparatus of claim 8 wherein at least one of the phosphate fertilizer and the blend of nitrogen and sulfur fertilizer is in a liquid form.

10. The method of claim 8 wherein at least one of the first and second product tanks carries a fertilizer blend that includes potassium fertilizer.

11. The method of claim 1 further comprising depositing sulfur fertilizer in the fertilizer furrows.

12. A seeding apparatus comprising:
   a plurality of side banding furrow openers laterally spaced along a seeder frame;

a plurality of mid-row banding furrow openers laterally spaced along the seeder frame such that a fertilizer furrow made by each mid-row banding furrow opener is located substantially midway between two seed furrows made by the side banding furrow openers;

a delivery system operative to deposit seeds through the side banding furrow openers into a corresponding plurality of seed furrows, and operative to deposit phosphate fertilizer through the side banding furrow openers into side bands in proximity to the corresponding seed furrows, and operative to deposit nitrogen fertilizer through the mid-row banding furrow openers into the fertilizer furrows.

13. The apparatus of claim 12 wherein the fertilizer furrow openers are located substantially midway between pairs of seed furrow openers such that two seed furrows lie between successive fertilizer furrows.

14. The apparatus of claim 13 wherein the side banding furrow openers are configured to place the side band between the corresponding seed furrow and a fertilizer furrow.

15. The apparatus of claim 12 wherein the seeder apparatus comprises:

a first product tank carrying a nitrogen fertilizer, and wherein the delivery system is operative to deliver the nitrogen fertilizer to the mid-row banding furrow openers;

a second product tank carrying phosphate fertilizer, and wherein the delivery system is operative to deliver the phosphate fertilizer to the side banding furrow openers; and a third product tank carrying seeds, and wherein the delivery system is operative to deliver the seeds to the side banding furrow openers.

16. The apparatus of claim 15 wherein at least one of the phosphate fertilizer and the nitrogen fertilizer is in a liquid form.

17. The apparatus of claim 15 wherein at least one of the first and second product tanks carries a fertilizer blend that includes potassium fertilizer.

18. The apparatus of claim 12 wherein the nitrogen fertilizer is blended with sulfur fertilizer.

* * * * *